(12) United States Patent
Li

(10) Patent No.: US 12,524,421 B2
(45) Date of Patent: Jan. 13, 2026

(54) VISUALIZATION METHODS AND APPARATUSES FOR QUERY RESULT OF GRAPH DATABASE

(71) Applicant: Alipay (Hangzhou) Information Technology Co., Ltd., Hangzhou (CN)

(72) Inventor: Pengfei Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/469,973

(22) Filed: Sep. 19, 2023

(65) Prior Publication Data
US 2024/0111778 A1 Apr. 4, 2024

(51) Int. Cl.
  G06F 16/00 (2019.01)
  G06F 16/242 (2019.01)
  G06F 16/248 (2019.01)

(52) U.S. Cl.
  CPC .......... *G06F 16/248* (2019.01); *G06F 16/244* (2019.01)

(58) Field of Classification Search
  CPC .............................. G06F 16/248; G06F 16/244
  USPC ................................................ 707/600–899
  See application file for complete search history.

(56) References Cited

U.S. PATENT DOCUMENTS

| | | | |
|---|---|---|---|
| 11,030,068 B1 * | 6/2021 | Agarwal | G06F 11/327 |
| 11,580,127 B1 * | 2/2023 | Newman | G06F 16/2246 |
| 11,669,556 B1 * | 6/2023 | Hasan | G06F 16/9024 |
| | | | 707/736 |
| 12,254,033 B2 * | 3/2025 | Pfitzmann | G06N 5/02 |
| 2020/0356599 A1 * | 11/2020 | Xia | G06F 16/287 |
| 2022/0342932 A1 * | 10/2022 | Monk | G06F 16/28 |
| 2022/0414228 A1 * | 12/2022 | Difonzo | G06F 16/24522 |
| 2023/0086327 A1 * | 3/2023 | Song | G06F 16/242 |
| | | | 382/159 |
| 2023/0409610 A1 * | 12/2023 | Gratzer | G06F 16/9024 |

* cited by examiner

*Primary Examiner* — Michelle N Owyang
(74) *Attorney, Agent, or Firm* — Womble Bond Dickinson (US) LLP

(57) ABSTRACT

A method includes: receiving query content input for a target relationship network graph in a graph database, where the target relationship network graph includes multiple nodes and connection edges between nodes; querying a matching query result graph from the target relationship network graph according to the query content, where the query result graph includes at least a target node; displaying the query result graph; in response to a first operation performed by a user in a display area of the target node, adding and displaying, in the query result graph, a first-order neighboring node of the target node and a connection edge between the target node and the first-order neighboring node; simultaneously adjusting positions of the target node, the first-order neighboring node, and the connection edge in response to a second operation performed by the user in a blank area other than a display area of the query result graph.

16 Claims, 13 Drawing Sheets

Create connection edge

Edge type: fault

Start node: 0

End node: 0

Attribute parameter:

FIG. 2b

| Movie | Movie duration | >= | 136 |

FIG. 2c

```
data: Object
status: 200
statusText: "OK"
headers: Object
config: Object
request: XMLHttpRequest
```

FIG. 5a

```
▾ data: Object
    elapsed: 0.10987567901611328
  ▾ header: Array(3)
    ▾ 0: Object
        name: "o.name"
        type: 0
    ▾ 1: Object
        name: "Y"
        type: 2
    ▾ 2: Object
        name: "m.title"
        type: 0
  ▾ result: Array(10)
    ▾ 0: Array(3)
        0: "Laurence Fishburne"
        1: "E[0_3937_0_0]"
        2: "The Matrix"
    ▾ 1: Array(3)
        0: "Laurence Fishburne"
        1: "E[0_3938_0_0]"
        2: "The Matrix Reloaded"
    ▾ 2: Array(3)
        0: "Laurence Fishburne"
        1: "E[0_3939_0_0]"
        2: "The Matrix Revolutions"
    ▾ 3: Array(3)
        0: "Carrie-Anne Moss"
        1: "E[1_3937_0_0]"
        2: "The Matrix"
    ▸ 4: Array(3)
    ▸ 5: Array(3)
    ▸ 6: Array(3)
    ▸ 7: Array(3)
    ▸ 8: Array(3)
    ▸ 9: Array(3)
      size: 10
    status: 200
    statusText: "OK"
  ▸ headers: Object
```

FIG. 5b

VISUALIZATION METHODS AND APPARATUSES FOR QUERY RESULT OF GRAPH DATABASE

TECHNICAL FIELD

One or more embodiments of this specification relate to the database field, and in particular, to visualization methods and apparatuses for a query result of a graph database.

BACKGROUND

To view a query result for a graph database more intuitively, a query result is usually visualized. Privacy data may be stored in the graph database.

Currently, the query result for the graph database is displayed in the following three forms: a graph, a table, and a text. When the query result is displayed by using a graph, a user generally cannot quickly view a neighboring node of any node.

Therefore, it is desirable to have an improved solution to simplify operation complexity of viewing the neighboring nodes of any node by the user, thereby improving user experience.

SUMMARY

One or more embodiments of this specification describe visualization methods for a query result of a graph database, which can simplify operation complexity of viewing a neighboring node of any node by a user, thereby improving user experience.

According to a first aspect, a visualization method for a query result of a graph database is provided, including:

receiving query content input for a target relationship network graph in a graph database, where the target relationship network graph includes multiple nodes and connection edges between the nodes;

querying a matching query result graph from the target relationship network graph according to the query content, where the query result graph includes at least a target node in the multiple nodes;

displaying the query result graph;

in response to a first operation performed by a user in a display area of the target node, adding and displaying, in the query result graph, a first-order neighboring node of the target node and a connection edge between the target node and the first-order neighboring node; and simultaneously adjusting positions of the target node, the first-order neighboring node, and the connection edge in response to a second operation performed by the user in a blank area other than a display area of the query result graph.

According to a second aspect, a visualization apparatus for a query result of a graph database is provided, including:

a receiving unit, configured to receive query content input for a target relationship network graph in a graph database, where the target relationship network graph includes multiple nodes and connection edges between the nodes;

a query unit, configured to query a matching query result graph from the target relationship network graph according to the query content, where the query result graph includes at least a target node in the multiple nodes; and a display unit, configured to display the query result graph;

the display unit being further configured to: in response to a first operation performed by a user in a display area of the target node, add and display, in the query result graph, a first-order neighboring node of the target node and a connection edge between the target node and the first-order neighboring node; and the display unit being further configured to: simultaneously adjust positions of the target node, the first-order neighboring node, and the connection edge in response to a second operation performed by the user in a blank area other than a display area of the query result graph.

According to a third aspect, a computer storage medium that stores a computer program is provided, and when the computer program is executed on a computer, the computer is caused to perform the method of the first aspect.

According to a fourth aspect, a computing device is provided and includes a memory and a processor. Executable code is stored in the memory, and when executing the executable code, the processor implements the method of the first aspect.

One or more embodiments of this specification provide visualization methods and apparatuses for a query result of a graph database. In a query result graph, a user only needs to perform a first operation in a display area of any node, so as to display a first-order or higher-order neighboring node of the node. This helps simplify operation complexity of viewing the neighboring node by the user and improve user experience.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

FIG. 2b is a schematic diagram illustrating an edit panel corresponding to a connection edge in an example;

FIG. 2c is a schematic diagram illustrating a condition setting control in an example;

FIG. 5a is a schematic diagram illustrating a text tree in an example;

FIG. 5b is a schematic diagram illustrating a text tree in another example; and

DESCRIPTION OF EMBODIMENTS

The following describes the solutions provided in this specification with reference to the accompanying drawings.

Figure 1:
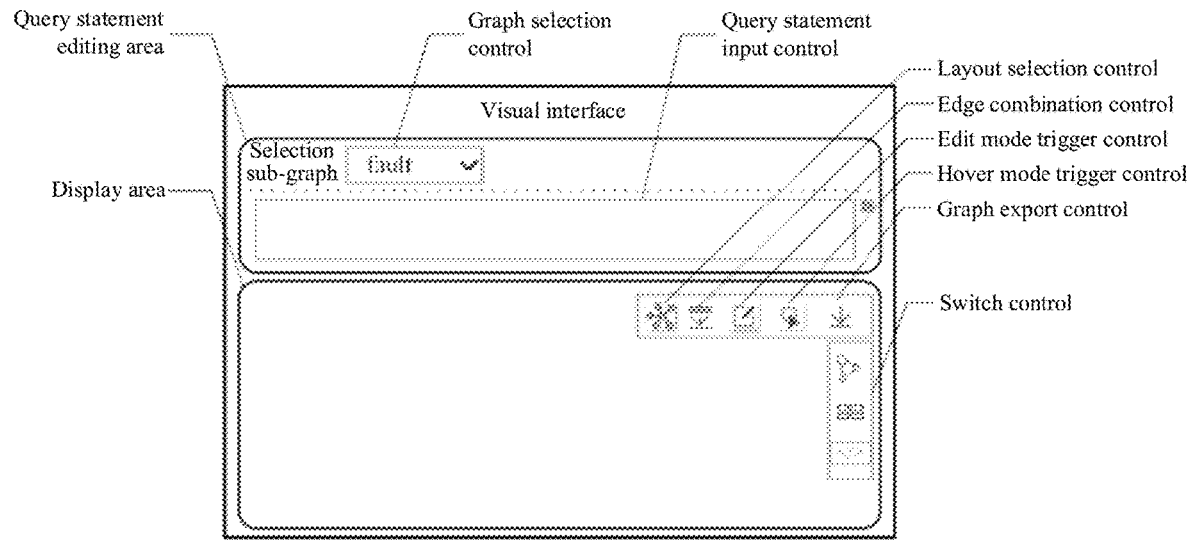
FIG. 1 is a schematic diagram illustrating a visual interface in an example.

FIG. 1 is a schematic diagram illustrating a visual interface in an example. In FIG. 1, the visual interface includes a query statement editing area and a display area.

The query statement editing area may include a graph selection control and a query statement input control. The graph selection control is used to select a relationship network graph to be queried, and the query statement input control is used to input a graph query statement (described subsequently). In an example, the graph query statement herein may be, for example, a cypher query statement. In addition, the relationship network graph herein may include but is not limited to any one of the following: an enterprise relationship network graph, a product relationship network graph, a person relationship network graph, an information relationship network graph, a stock relationship network graph, a fund relationship network graph, and an organization relationship network graph.

The display area may include a layout selection control, an edge combination control, an edit mode trigger control, a hover mode trigger control, a graph export control, a switch control, and the like. It should be noted that these controls can be triggered by a left-click.

After the layout selection control is triggered, a layout selection menu may be invoked, and options therein may include an elastic layout, a tree layout, a ring layout, and a grid layout. Then, a query result graph is adjusted according to a selected target layout. It should be noted that, in the elastic layout, positions of a node and a neighboring node of the node are simultaneously adjusted in response to a drag operation performed by a user in a display area of the node. That is, in the elastic layout, a neighboring node of a node moves with the node.

After the edge combination control is triggered, connection edges that are of any two nodes in the query result graph and that have a same direction and a same type may be combined.

After the edit mode trigger control is triggered, an edit mode of the query result graph can be entered. In the edit mode, a node creation control and a connection edge creation control can be added and displayed. Specifically, when a click instruction for the node creation control (or the edge creation control) is received, a corresponding edit panel may be displayed. In one example, the edit panel may be displayed in a display area. In another example, the edit panel may also be a separate page.

Figure 2A:
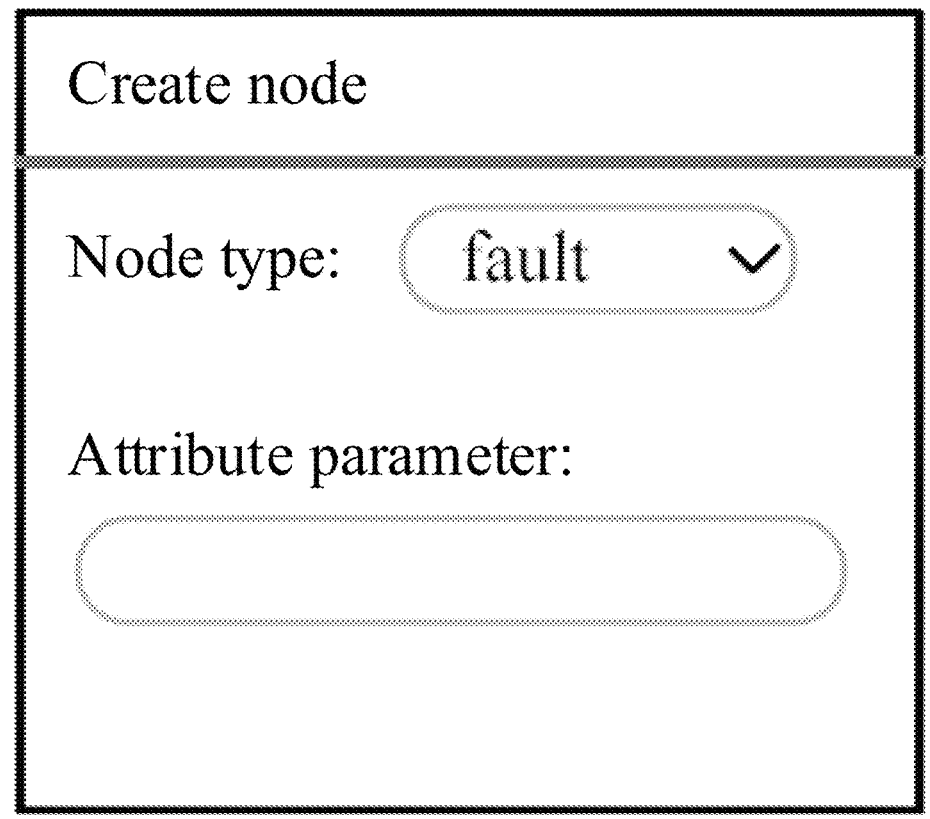
FIG. 2a is a schematic diagram illustrating an edit panel corresponding to a node in an example.

FIG. 2a is a schematic diagram illustrating an edit panel corresponding to a node in an example. Through this edit panel, the user can set node information such as a node type and an attribute parameter of the node. The person relationship network graph is used as an example. The node type herein may be, for example, person, movie, or occupation. FIG. 2b is a schematic diagram illustrating an edit panel corresponding to a connection edge in an example. By using the edit panel, the user may set edge information such as an edge type of a connection edge, a start node, an end node, and an attribute parameter.

Back to FIG. 1, after the hover mode trigger control is triggered, a hover mode may be entered. In the hover mode, in response to a hover operation performed by the user in a display area of a node, a first-order neighboring node of the node is displayed in a highlight or flashing manner.

After the graph export control is triggered, a format selection menu may be invoked to select a target format. Options in the format selection menu may include a json format, a png format, a csv format, and the like. Then, the query result graph is exported as a picture file in the target format.

The foregoing switch control is used to switch among a graph display mode, a text tree display mode, and a table display mode. In the graph display mode, a query result graph for a graph database is displayed, including a node and a connection edge. In the text tree display mode, a text tree corresponding to a query result set of the graph database is displayed, where a text node supports collapsing and expanding. In the table display mode, a table corresponding to the query result set of the graph database is displayed, where one row corresponds to one query result.

Certainly, in an actual application, the display area may further include another control, for example, a style setting control, used to set a color, a size, an attribute parameter, or the like of a node or a connection edge. For another example, a condition setting control is used to set a filter condition of a node or a connection edge. In an example, the condition setting control may be shown in FIG. 2c. In FIG. 2c, the condition setting control includes one display button, two pull-down boxes, and one input box, where the display button is used to display a currently selected node or connection edge (for example, a movie node), the first pull-down box is used to select an attribute parameter (for example, movie duration), the second pull-down box is used to select a condition symbol, supported options include: =, >=, >, <, <=, and the input box is used to input a condition threshold (for example, 136).

The person relationship network graph is also used as an example. When the node type is human, the attribute parameter may be, for example, an identity, an occupation, or a hobby. When the node type is movie, the attribute parameter may be, for example, a leading role, a director, or movie duration.

The following describes in detail the above-mentioned graph query statement.

The graph query statement includes at least a MATCH clause and a RETURN clause, and the following first describes the MATCH clause.

The MATCH clause may include a matching expression (also referred to as a path) that is formed by a node and/or a connection edge.

In an example, the matching expression may be represented as (n)-[r]-(m), where "( )" is a node identifier, and letters n and m are aliases of the node and may be omitted. "[ ]" is a connection edge identifier, and a letter r is an alias of the connection edge and may be omitted. In addition, "-[r]-" indicates that a connection edge between nodes is a non-directional edge or a bi-directional edge, and may be replaced with "-[r]→" and "←-[r]-", indicating an ingress edge and an egress edge, respectively. It should be understood that the ingress edge and the egress edge herein are relative to a node n.

Certainly, in an actual application, a corresponding node type may be further set for a node or a connection edge. For example, the matching expression may alternatively be (n:person)-[r]-(m:movie), where "person" is a node type of a node "n", and "movie" is a node type of a node "m".

It should be understood that, based on the foregoing matching expression, several network sub-graphs may be matched from a to-be-queried relationship network graph.

The foregoing RETURN clause may include several query fields, and each query field may be any one of the following: a path, a node, a connection edge, an attribute parameter, a target function, and the like. For example, the target function may be an aggregation function.

It should be noted that the graph query statement may further include another clause, for example, a LIMIT clause, which is used to limit a quantity of returned query results. Details are not described herein.

The following describes the solution with reference to the visual interface shown in FIG. 1.

Figure 3:
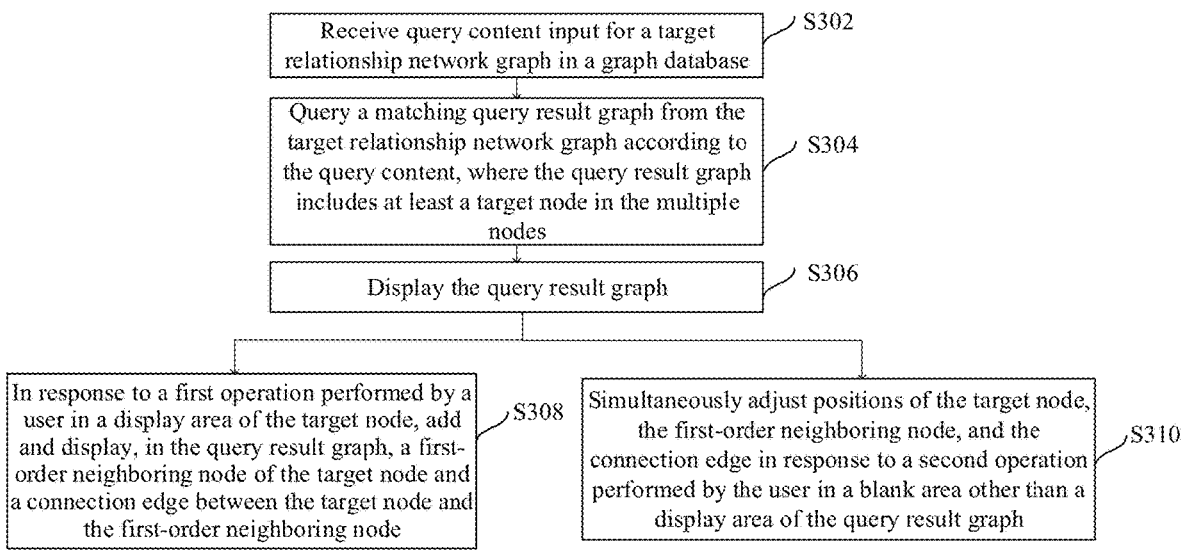
FIG. 3 is a flowchart illustrating a visualization method for a query result of a graph database, according to an embodiment.

FIG. 3 is a flowchart illustrating a visualization method for a query result of a graph database, according to an embodiment. The method can be performed by any system, device, platform, or device cluster that has computing and processing capabilities, for example, performed by a visualization system. The visualization system includes the visual interface shown in FIG. 1. As shown in FIG. 3, the method may include the following steps:

Step 302: Receive query content input for a target relationship network graph in a graph database.

The target relationship network graph includes multiple nodes and connection edges between the nodes.

In an example, the query content may be a graph query statement. Specifically, the graph query statement may be received by using the query statement editing area in the visual interface shown in FIG. 1.

In another example, the query content includes a combination of query conditions entered by the user by using a control on the visual interface.

Step 304: Query a matching query result graph from the target relationship network graph according to the query content, where the query result graph includes at least a target node in the multiple nodes.

When the query content is a graph query statement, the query result graph may be obtained by combining several network sub-graphs matched from the target relationship network graph based on a matching expression in a MATCH clause in the graph query statement. In addition, when the query content is a graph query statement, a query result set may be further obtained, and each query result is a field value of each query field corresponding to a matching network sub-graph.

Step 306: Display the query result graph.

When the query content is a graph query statement, the query result graph may be obtained by drawing each network sub-graph based on matched detailed data of a node and a connection edge in each network sub-graph when determining that each query field in the query result set includes a graph element (for example, a node, a connection edge, or a path).

A method for obtaining the detailed data may include: first parsing the query result set to determine a node identifier and an edge identifier in each network sub-graph, and then obtaining detailed data of the node and the connection edge from the graph database based on the node identifier and the edge identifier.

For a node, detailed data may include a node type, an attribute parameter, a node identifier, and the like. For a connection edge, detailed data may include an edge type, a start node, an end node, an attribute parameter, an edge identifier, and the like.

In step 306, the query result graph may be displayed in the display area in the visual interface shown in FIG. 1. The query result graph may include the target node. In addition, each neighboring node in a predetermined order (greater than or equal to 1) of the target node and a connection edge between nodes may be further included.

Figure 4A:
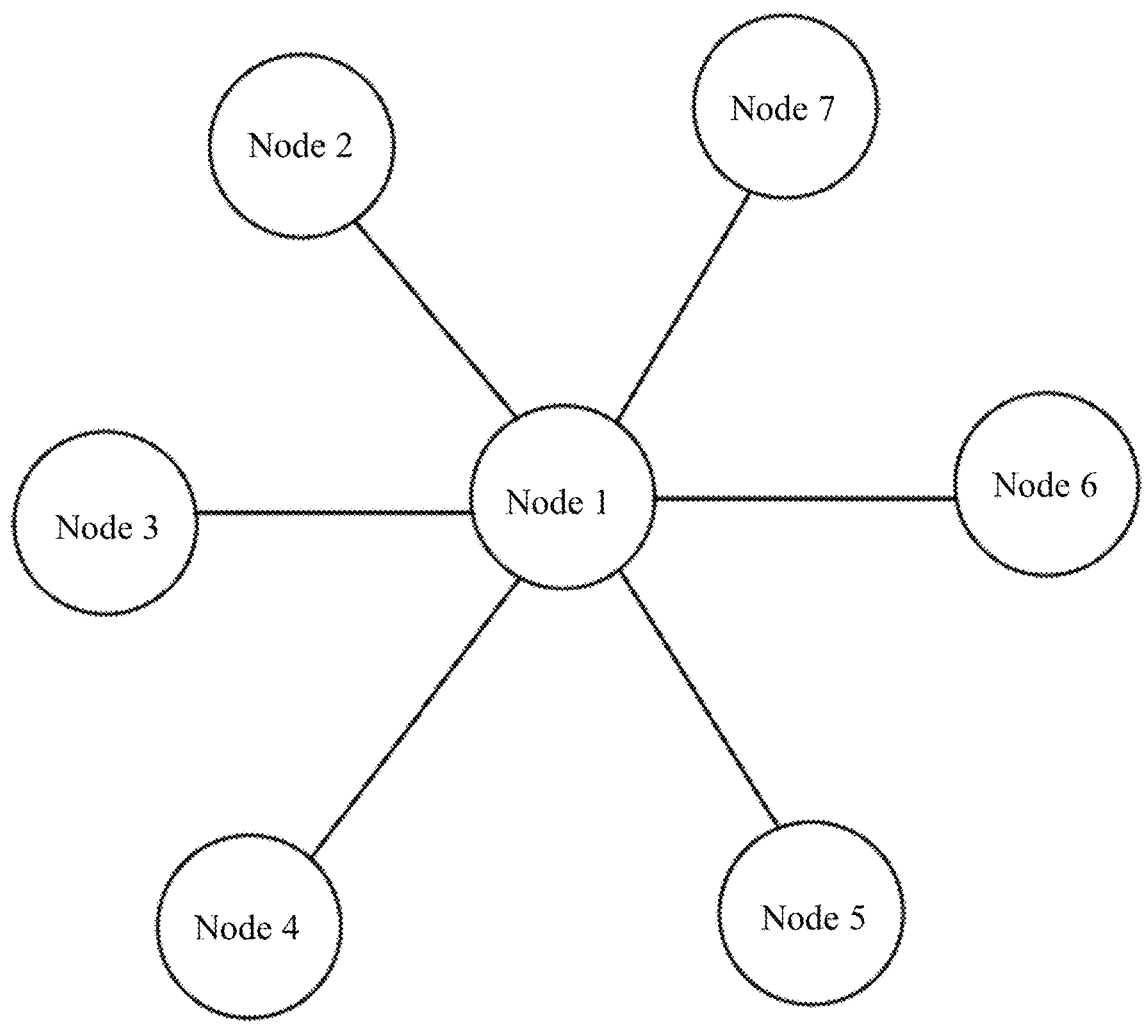
FIG. 4a is a schematic diagram illustrating a query result graph in an example.

FIG. 4a is a schematic diagram illustrating a query result graph in an example. In FIG. 4a, the query result graph includes a node 1 and each first-order neighboring node (that is, a node 2 to a node 7) of the node 1, and a connection edge between the node 1 and each first-order neighboring node.

It should be understood that FIG. 4a is merely an example description. In an actual application, display content (also referred to as a node value) of a node in FIG. 4a may also be replaced with a node name, a node type, a node identifier, a node attribute parameter, or the like. In addition, display content (also referred to as an edge value) of a connection edge may be an edge name, an edge type, an edge identifier, an edge attribute parameter, or the like.

It should be noted that the query result graph may have multiple layouts, and the multiple layouts include an elastic layout, a tree layout, a ring layout, and a grid layout.

In the elastic layout, in response to a drag operation performed by the user in a display area of the target node, positions of the node and a neighboring node of the node are simultaneously adjusted. That is, in the elastic layout, a neighboring node of a node moves with the node.

FIG. 4a is used as an example. In response to a drag operation performed by the user on the node 1, positions of the node 1 and the node 2 to the node 7 may be simultaneously adjusted.

Figure 4B:
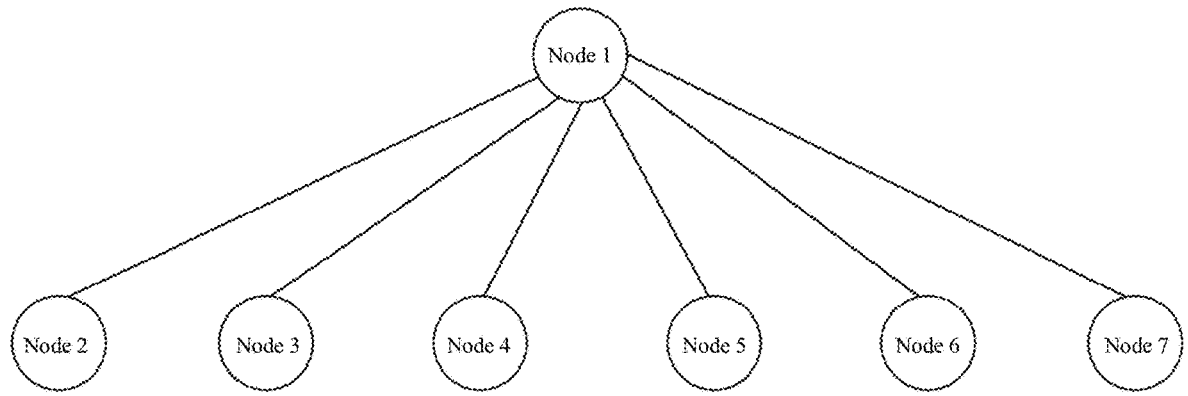
FIG. 4b illustrates a tree layout of a query result graph in an example.
Figure 4C:
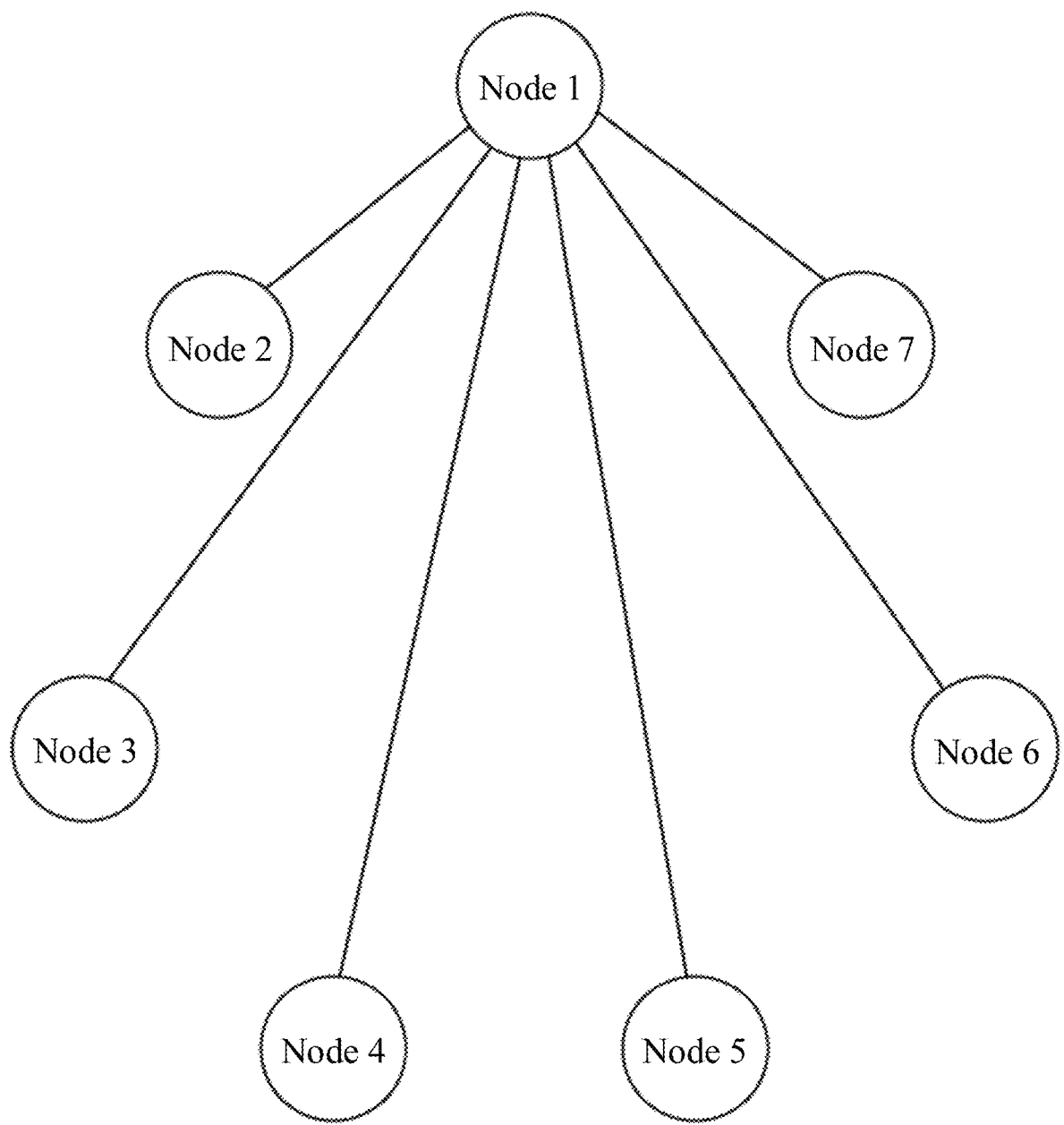
FIG. 4c illustrates a ring layout of a query result graph in an example.
Figure 4D:
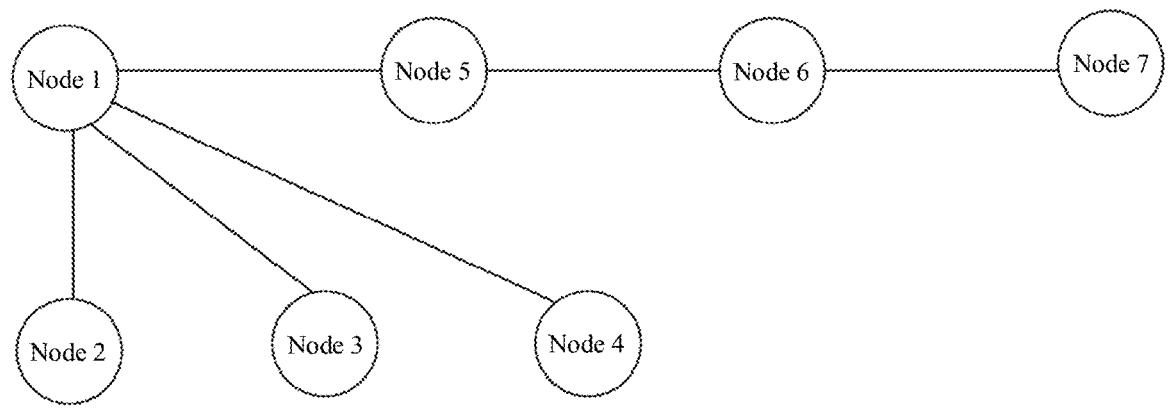
FIG. 4d illustrates a grid layout of a query result graph in an example.

FIG. 4b illustrates a tree layout of a query result graph in an example; FIG. 4c illustrates a ring layout of a query result graph in an example; and FIG. 4d illustrates a grid layout of a query result graph in an example.

Step 308: In response to a first operation performed by a user in a display area of the target node, add and display, in the query result graph, a first-order neighboring node of the target node and a connection edge between the target node and the first-order neighboring node.

The first operation may be, for example, a click operation, or may be a double-click operation.

Certainly, if some first-order neighboring nodes of the target node are already included in the query result graph, the adding and displaying a first-order neighboring node of the target node includes: adding and displaying a remaining first-order neighboring node of the target node and a connection edge between the target node and the remaining first-order neighboring node in the query result graph.

Figure 4E:
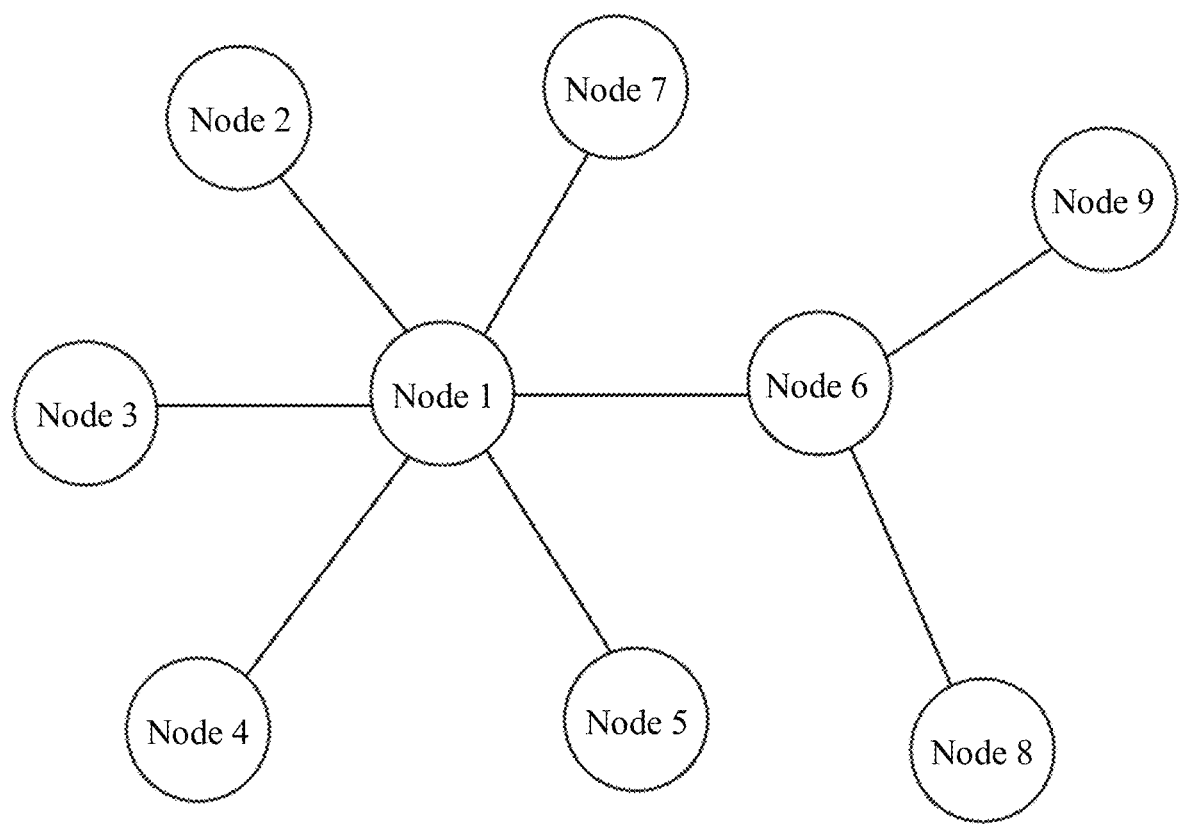
FIG. 4e is a schematic diagram illustrating a query result graph in another example.

FIG. 4a is used as an example. In response to a double-click operation performed by the user in a display area of the node 6, a query result graph shown in FIG. 4e may be obtained. In FIG. 4e, two remaining first-order neighboring nodes of the node 6 are added and displayed: a node 8 and a node 9.

Step 310: Simultaneously adjust positions of the target node, the first-order neighboring node, and the connection edge in response to a second operation performed by the user in a blank area other than a display area of the query result graph.

The second operation may be, for example, a drag operation or a slide operation.

It should be understood that step 310 is to adjust a display position of the entire query result graph based on the second operation performed by the user.

In an actual application, step 310 may be performed before step 308 is performed. Alternatively, step 308 and step 310 are simultaneously performed, which is not limited in this specification.

Optionally, the method may further include the following steps: receiving a hover mode trigger instruction, and entering a hover mode; and in the hover mode, displaying the target node and the first-order neighboring node in a highlight or flashing manner in response to a hover operation performed by the user in the display area of the target node.

Figure 4F:
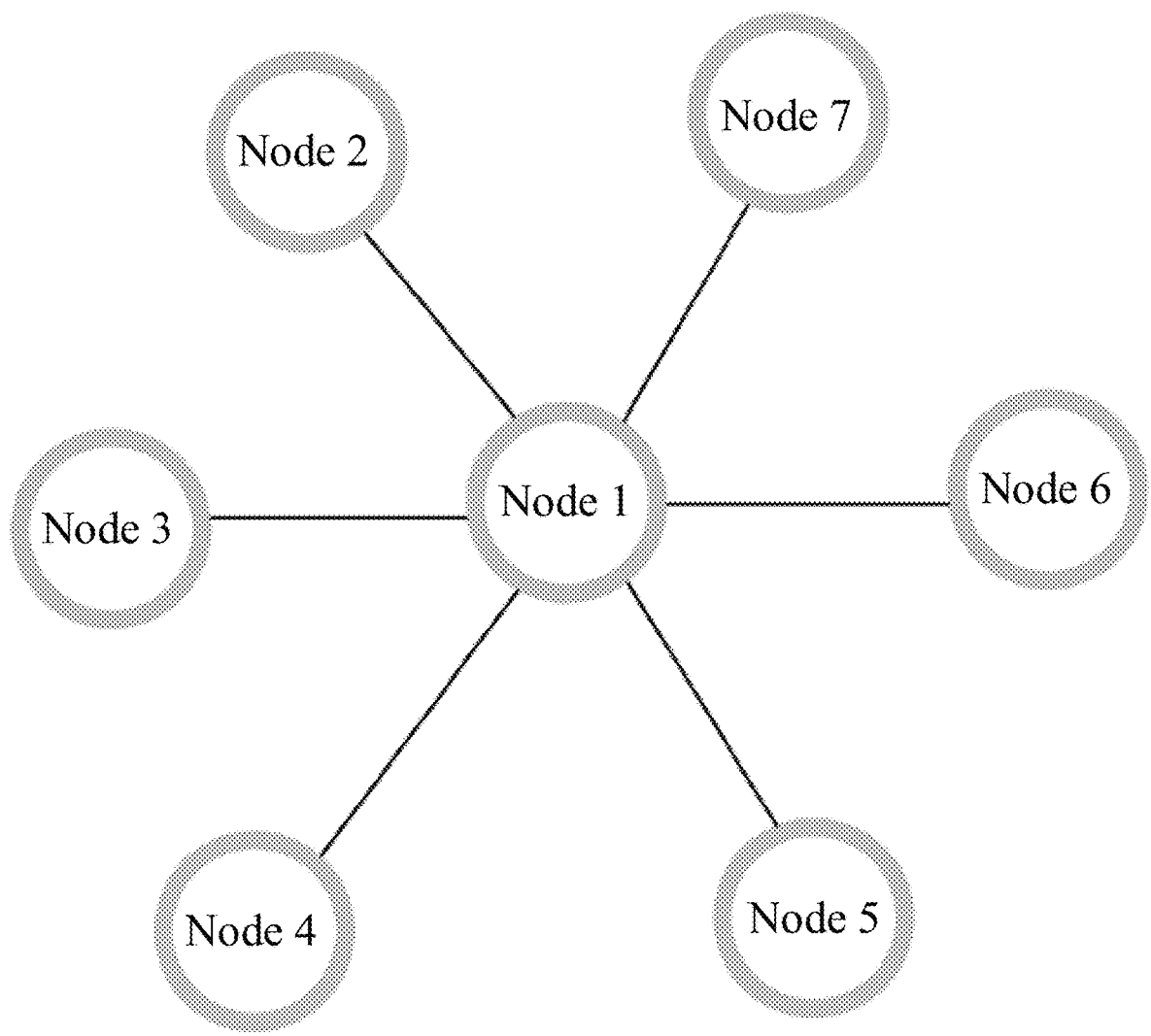
FIG. 4f is a schematic diagram illustrating a query result graph in still another example.

FIG. 4a is further used as an example, and a click instruction of the user on the hover mode trigger control in the visual interface shown in FIG. 1 may be first received, so as to enter the hover mode. In the hover mode, in response to a hover operation performed by the user in the display area of the node 1, a query result graph shown in FIG. 4f may be obtained. In FIG. 4f, a node 1 and each first-order neighboring node of the node 1 are highlighted and displayed: a node 2 to a node 7.

Optionally, the method may further include the following step: displaying an order selection menu in response to a right-click operation performed by the user in the display area of the target node; and adding and displaying, according to a target order selected from the order selection menu, neighboring nodes of the target node in the target order.

It should be understood that the adding and displaying neighboring nodes of the target node in the target order herein includes: adding and displaying a first-order neighboring node not included in the query result graph, and each neighboring node of the target node that starts from a second-order node to the target order.

Figure 4G:
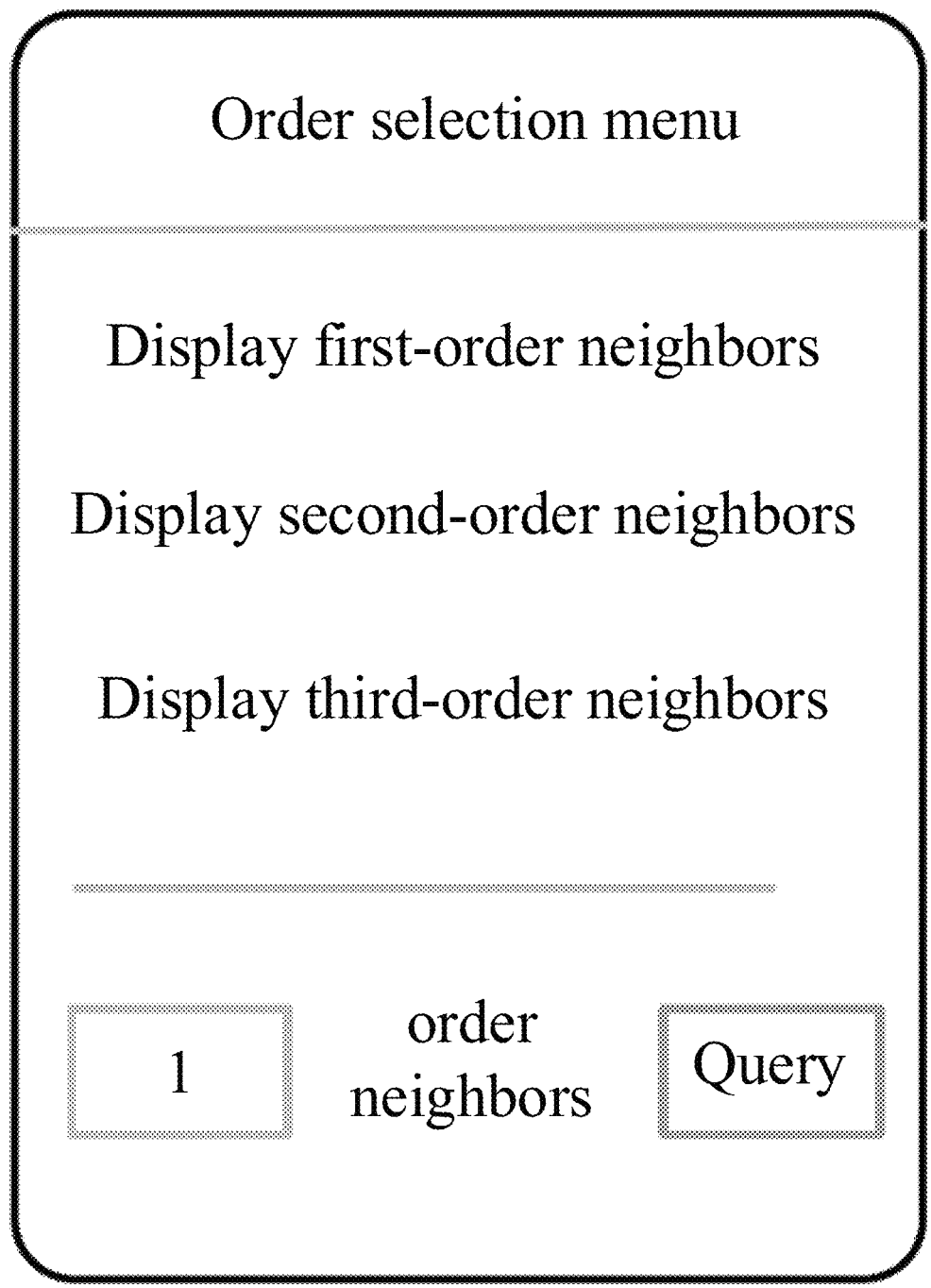
FIG. 4g is a schematic diagram illustrating an order selection menu in an example.

FIG. 4e is used as an example. In response to a right-click operation performed by the user in a display area of the node 6, an order selection menu shown in FIG. 4g may pop up, and the order selection menu includes three optional orders. In addition, an order input box and a query button are further included, and are used by the user to customize the target order.

Specifically, the target order may be determined according to a click instruction of the user on any one of the three optional orders, and then a neighboring node of the target node in the target order and a connection edge between nodes are added and displayed. The connection edge herein may be determined based on a network structure of the target relationship network graph.

Certainly, the target order may alternatively be determined according to an order entered by the user in the order input box.

In an embodiment, for the displayed query result graph, multiple same-direction and same-type connection edges between two nodes may be further combined.

For example, the query result graph includes the target node and the first-order neighboring node of the target node, the target node is connected to the first-order neighboring node by using multiple connection edges, and directions and types of the multiple connection edges are the same. Then, an edge combination instruction may be received, so as to combine the multiple connection edges between the target node and the first-order neighboring node to obtain an aggregation edge. The aggregation edge has a same direction and type as the multiple corresponding connection edges. Then, the aggregation edge may be used to replace display of the multiple corresponding connection edges.

For the aggregation edge, a quantity attribute may also be added to the aggregation edge, and an attribute value of the quantity attribute is a total quantity of multiple corresponding connection edges.

In addition, the edge combination instruction may be triggered by clicking the edge combination control in the visual interface shown in FIG. 1 by the user.

Figure 4H:
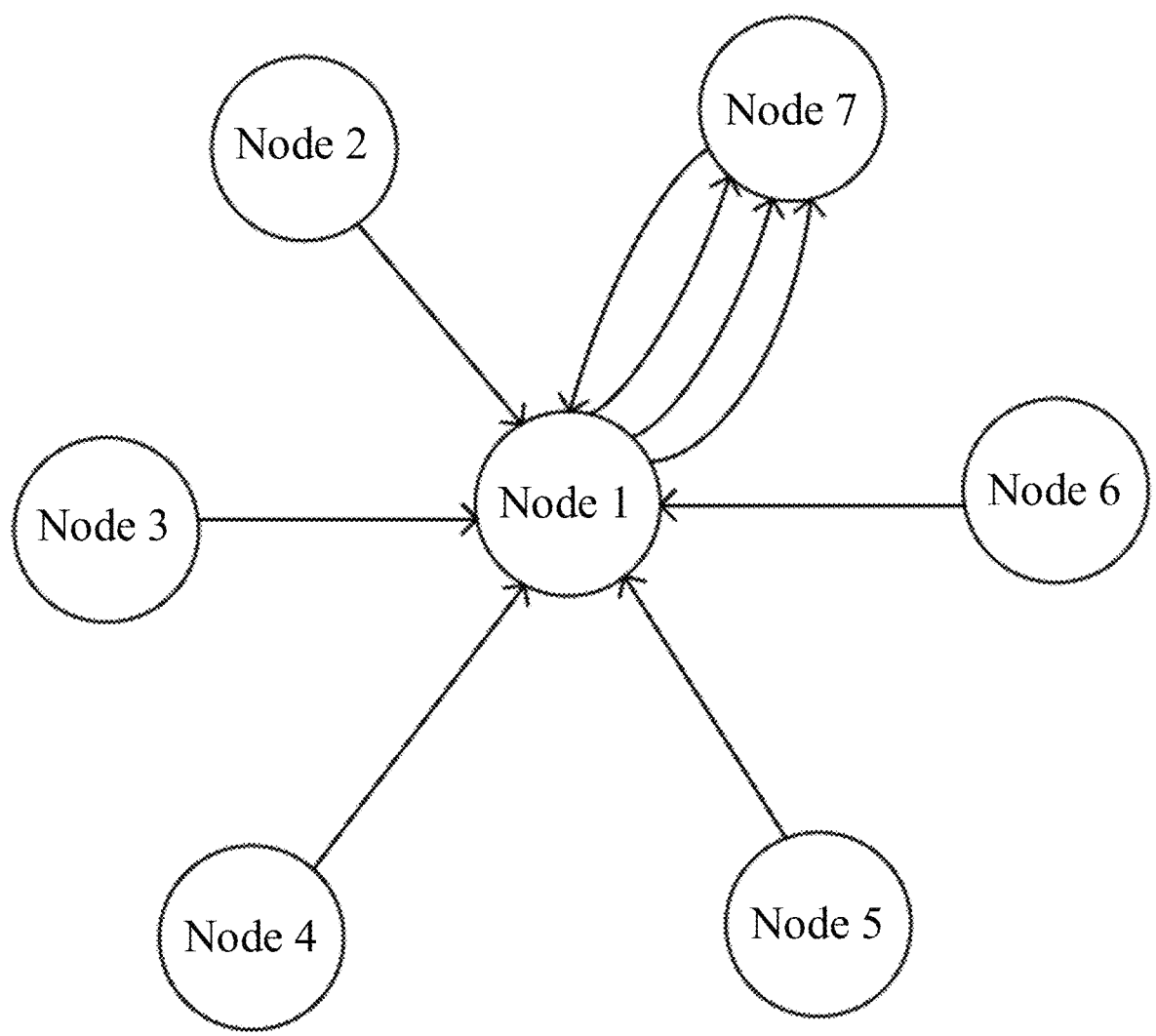
FIG. 4h is a schematic diagram illustrating a query result graph in yet another example.
Figure 4I:
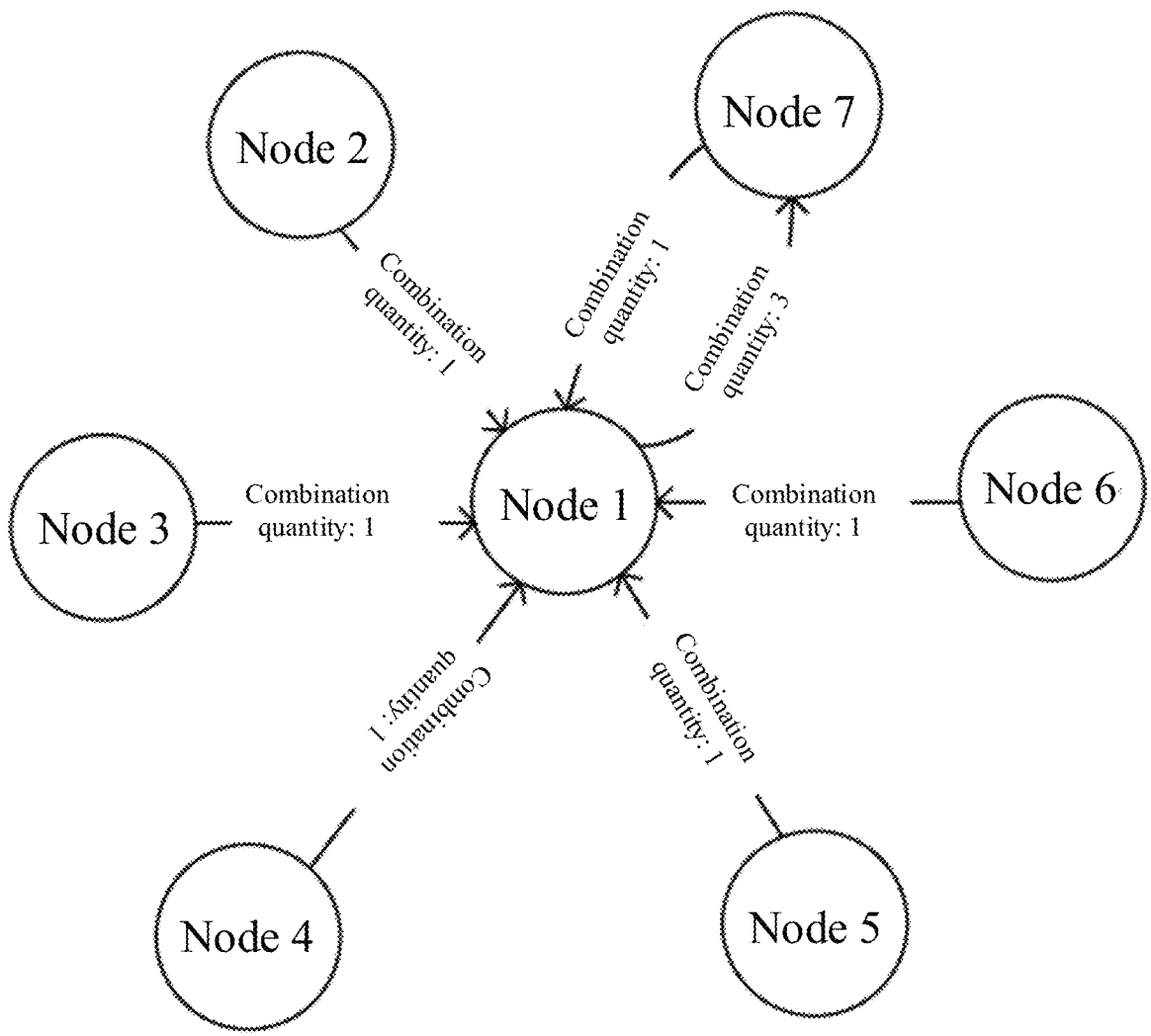
FIG. 4i is a schematic diagram illustrating a query result graph in still yet another example.

FIG. 4h is a schematic diagram illustrating a query result graph in yet another example. In FIG. 4h, a node 1 is connected to a node 7 by using four connection edges, and directions and types of three connection edges are the same. Then, when an edge combination instruction is received, an obtained query result graph may be shown in FIG. 4i. In FIG. 4i, both the node 1 and the node 2 to the node 7 are connected by using aggregation edges, and display content of the aggregation edges is a quantity of combined connection edges. Certainly, in an actual application, the display content of the aggregation edge may further include an edge type and the like.

In another embodiment, for the displayed query result graph, filtering processing may be further performed on a node or a connection edge based on a filter condition.

Specifically, a filter condition set by the user on an attribute parameter of a node (for example, the target node or the first-order neighboring node of the target node) or a connection edge in the query result graph may be received. Then, a node or a connection edge that does not meet the filter condition is deleted from the query result graph to obtain a filtered query result graph. The filtered query result graph is displayed.

The user may set the filter condition by using the condition setting control in the visual interface shown in FIG. 1. For the condition setting control, refer to FIG. 2c. It is assumed that a filter condition: movie.duration>=136 is obtained based on content of the condition setting control in FIG. 2c, a movie node whose movie duration is less than 136 minutes may be deleted from the query result graph.

In still another embodiment, the displayed query result graph may also be edited.

Specifically, an edit mode trigger instruction may be first received, so as to enter the edit mode. The edit mode trigger instruction may be triggered by clicking the edit mode trigger control in the visual interface shown in FIG. 1 by the user.

After the edit mode is entered, a node creation control and a connection edge creation control can be added and displayed. Specifically, when a click instruction for the node creation control (or the edge creation control) is received, a corresponding edit panel may be displayed. For details, refer to FIG. 2a or FIG. 2b. In one example, the edit panel may be displayed in a display area. In another example, the edit panel may also be a separate page.

Finally, the query result graph is updated and displayed based on node information and/or edge information set by the user by using the edit panel.

Certainly, in the edit mode, a deletion instruction of the user for a node and/or a connection edge may further be received, and the node and/or the connection edge is correspondingly deleted according to the deletion instruction. In addition, a modification instruction of the user on display content of a node/or a connection edge may further be received, and the display content of the node/or the connection edge is correspondingly modified according to the modification instruction.

In still another embodiment, a style of the displayed query result graph may be further set.

Specifically, the query result graph is updated and displayed in response to a style setting operation performed by the user on a node (for example, the target node or the first-order neighboring node of the target node) or a connection edge in the query result graph. The style setting operation includes a color/size setting operation or an attribute parameter setting operation.

In yet another embodiment, the displayed query result graph may further be exported as a picture file.

Specifically, a graph export instruction may be received, and a to-be-exported target format is determined according to the graph export instruction. The query result graph is exported as a picture file in the target format. The target format herein includes any one of the following: a json format, a png format, a csv format, or the like.

The graph export instruction may be triggered by clicking the graph export control in the visual interface shown in FIG. 1 by the user.

In another embodiment, the displayed query result graph may further be scaled.

Specifically, a scaled-down/scaled-up query result graph is displayed in response to an upward/downward scroll operation performed by the user in a blank area of the display area. In an example, the scale-down or scale-up operation herein is performed in a predetermined proportion.

In addition, in response to a click operation performed by the user in the display area of the node in the query result graph, each attribute parameter of the target node may be added and displayed.

Finally, this solution further supports switching a graph display mode to a tree display mode or a table display mode.

Specifically, a switching instruction for switching from the graph display mode to the tree display mode may be received. The query result graph is switched to a text tree according to the switching instruction. The switching instruction may be triggered by clicking the switch control in the visual interface shown in FIG. 1 by the user.

The text tree includes at least a first text node, the first text node has two types of text sub-nodes, and one type of text sub-node is configured to record each query result in a query result set corresponding to the query result graph; and the other type of text sub-node is configured to record each query field included in the query result set. Each query field herein is determined based on a RETURN clause, and each query field may be any one of the following: a path, a node, a connection edge, an attribute parameter, a target function, and the like.

Certainly, in an actual application, the text tree may further include another text node, and the first text node may further include another type of text sub-node, for example, the another type of text sub-node is used to record query time. This is not limited in this specification.

It should be noted that all types of text sub-nodes of the first text node support collapsing and expanding.

FIG. 5a is a schematic diagram illustrating a text tree in an example. The text tree is drawn based on a query result set obtained by using the following graph query statement: MATCH (n)-[r]-(m) RETURN n.name,r,m.title LIMIT 10. It can be learned from the graph query statement that the returned query result set includes 10 query results, and the query result set includes three query fields: an attribute parameter of a node n: name, a connection edge r, and an attribute parameter of a node m: title. In other words, each query result includes field values corresponding to the three query fields.

In FIG. 5a, the text tree includes five text nodes: data, status, status Text, headers, config, and request, where data, headers, and config each have a text sub-node. Specifically, when an expanding instruction for data is received, various types of text sub-nodes therein may be expanded. For details, refer to FIG. 5b.

In FIG. 5b, four types of text sub-nodes of data are shown: elapsed, header, result, and size, where elapsed is used to record query time; header is used to record the three query fields; result is used to record 10 query results, where each query result includes three field values corresponding to the three query fields; and size is used to record a quantity of query results: 10.

Certainly, when a collapsing instruction for data is received in FIG. 5b, the various types of text sub-nodes therein may be collapsed, thereby returning to FIG. 5a.

In addition, a switching instruction for switching from the graph display mode (or the tree display mode) to the table display mode may be further received. The switching instruction may be triggered by clicking the switch control in the visual interface shown in FIG. 1 by the user. According to the switching instruction, the query result graph (text tree) is switched to a table. A header of the table includes each query field included in the query result set, and table content includes each query result in the query result set.

In conclusion, in the visualization method for a query result of a graph database provided in this embodiment of this specification, in a query result graph, a user needs to perform only a first operation in a display area of a node, so as to view all first-order neighboring nodes of the node. In addition, the user can also view a neighboring node of a node in a target order by clicking the target order in an order selection menu. In summary, this solution can simplify operation complexity of viewing a neighboring node by the user.

In addition, this solution can perform multiple types of operations on a displayed query result graph. For example, a scroll wheel is scrolled up/down to scale-down/scale-up the query result graph, and filter a node or a connection edge in the query result graph.

Finally, in a text tree display mode, various types of text sub-nodes in a text tree support collapsing and expanding, thereby improving text readability.

Figure 6:
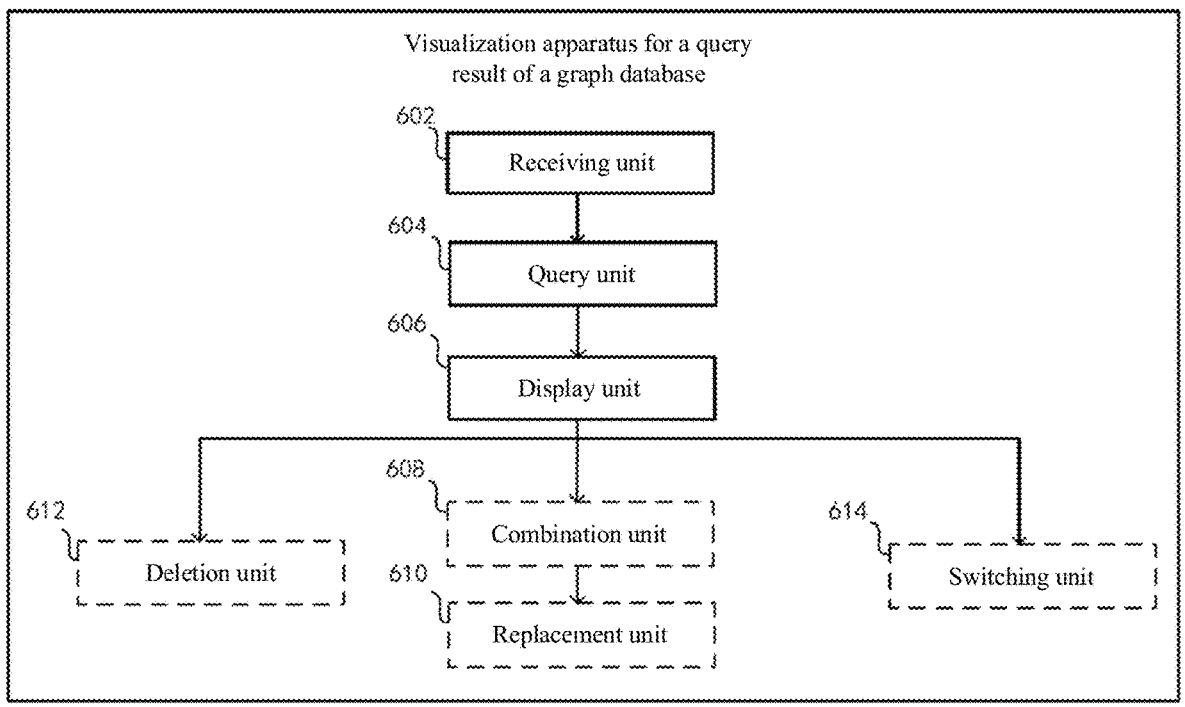
FIG. 6 is a schematic diagram illustrating a visualization apparatus for a query result of a graph database, according to an embodiment.

Corresponding to the foregoing visualization method for a query result of a graph database, an embodiment of this specification further provides a visualization apparatus for a query result of a graph database. As shown in FIG. 6, the apparatus may include:
- a receiving unit 602, configured to receive query content input for a target relationship network graph in a graph database, where the target relationship network graph includes multiple nodes and connection edges between the nodes;
- a query unit 604, configured to query a matching query result graph from the target relationship network graph according to the query content, where the query result graph includes at least a target node in the multiple nodes in the target relationship network graph; and
- a display unit 606, configured to display the query result graph;
- the display unit 606 being further configured to: in response to a first operation performed by a user in a display area of the target node, add and display, in the query result graph, a first-order neighboring node of the target node and a connection edge between the target node and the first-order neighboring node; and
- the display unit 606 being further configured to: simultaneously adjust positions of the target node, the first-order neighboring node, and the connection edge in response to a second operation performed by the user in a blank area other than a display area of the query result graph.

Optionally, the receiving unit 602 is further configured to: receive a hover mode trigger instruction, and enter a hover mode; and the display unit 606 is further configured to: in the hover mode, display the target node and the first-order neighboring node in a highlight or flashing manner in response to a hover operation performed by the user in the display area of the target node.

Optionally, the display unit 606 is further configured to display an order selection menu in response to a right-click operation performed by the user in the display area of the target node; and the display unit 606 is further configured to add and display, according to a target order selected from the order selection menu, neighboring nodes of the target node in the target order.

Optionally, the target node in the query result graph is connected to the first-order neighboring node by using multiple connection edges, and directions and types of the multiple connection edges are the same. The apparatus further includes a combination unit 608 and a replacement unit 610;

the receiving unit 602 is further configured to receive an edge combination instruction;

the combination unit 608 is configured to combine the multiple connection edges to obtain an aggregation edge, where the aggregation edge has a same direction and type as the multiple corresponding connection edges; and the replacement unit 610 is configured to replace display of the multiple corresponding connection edges by using the aggregation edge.

Optionally, the apparatus further includes:

an addition unit (not shown in the figure), configured to add a quantity attribute to the aggregation edge, where an attribute value of the quantity attribute is a total quantity of corresponding multiple connection edges.

Optionally, the apparatus further includes a deletion unit 612;

the receiving unit 602 is further configured to receive a filter condition set by the user on an attribute parameter of a node or a connection edge;

the deletion unit 612 is configured to delete, from the query result graph, a node or a connection edge that does not meet the filter condition, to obtain a filtered query result graph; and the display unit 606 is further configured to display the filtered query result graph.

Optionally, the receiving unit 602 is further configured to: receive an edit mode trigger instruction and enter an edit mode; and the display unit 606 is further configured to: in the edit mode, update and display the query result graph in response to an edit operation performed by the user on the query result graph;

where the edit operation includes creating, deleting, or modifying a node or a connection edge.

Optionally, the apparatus further includes a switching unit 614;

the receiving unit 602 is further configured to receive a switching instruction for switching from a graph display mode to a tree display mode; and the switching unit 614 is configured to switch the query result graph to a text tree according to the switching instruction;

where the text tree includes at least a first text node, the first text node has two types of text sub-nodes, and one type of text sub-node is configured to record each query result in a query result set corresponding to the query result graph; and the other type of text sub-node is configured to record each query field included in the query result set.

The two types of text sub-nodes support collapsing and expanding.

Optionally, a layout of the query result graph is an elastic layout, and the apparatus further includes:

an adjustment unit (not shown in the figure), configured to: in response to a drag operation performed by the user in the display area of the target node, simultaneously adjust positions of the target node, the first-order neighboring node, and a connection edge between the target node and the first-order neighboring node.

Optionally, the display unit 606 is further configured to update and display the query result graph in response to a style setting operation performed by the user on a node or a connection edge;

where the style setting operation includes a color/size setting operation or an attribute parameter setting operation.

Optionally, the display unit 606 is further configured to: in response to a mouse click operation performed by the user in the display area of the target node, add and display each attribute parameter of the target node.

Optionally, the apparatus further includes an export unit (not shown in the figure); and the receiving unit 602 is further configured to: receive a graph export instruction, and determine a to-be-exported target format according to the graph export instruction; and the export unit is configured to export the query result graph as a picture file in the target format;

where the target format includes any one of the following: a json format, a png format, and a csv format.

Optionally, the display unit 606 is further configured to display a scaled-down/scaled-up query result graph in response to a scroll up/down operation by the user in the blank area of the display area.

Functions of function modules of the previous apparatus embodiment of the present specification can be implemented by performing the steps in the previous method embodiment. A specific working process of the apparatus provided in some embodiments of the present specification is omitted here.

An embodiment of this specification provides a visualization apparatus for a query result of a graph database, which can simplify operation complexity of viewing a neighboring node by a user.

According to an embodiment of another aspect, a computer readable storage medium is further provided, on which a computer program is stored. When the computer program is executed in a computer, the computer is caused to perform the method described with reference to FIG. 3.

According to an embodiment of still another aspect, a computing device is further provided and includes a memory and a processor. Executable code is stored in the memory, and when executing the executable code, the processor implements the method with reference to FIG. 3.

The embodiments in this specification are described in a progressive way. For the same or similar parts of the embodiments, references can be made to the embodiments. Each embodiment focuses on a difference from other embodiments. Particularly, a device embodiment is similar to a method embodiment, and therefore is described briefly. For related parts, references can be made to related descriptions in the method embodiment.

The methods or algorithm steps described with reference to the content disclosed in the present specification can be implemented in a hardware method, or can be implemented in a method in which a processor executes a software instruction. The software instruction can be formed by a corresponding software module, and the software module can be stored in a RAM memory, a flash memory, a ROM memory, an EPROM memory, an EEPROM memory, a register, a hard disk, a removable hard disk, a CD-ROM, or any other form of storage medium well known in the art. An example storage medium is coupled to the processor, so the processor can read information from the storage medium and can write information to the storage medium. Certainly, the storage medium may also be an integral part of the processor. The processor and the storage medium may be located in the ASIC. In addition, the ASIC can be located in a server. Certainly, the processor and the storage medium can also exist in the server as separate parts.

A person skilled in the art should be aware that in the previous one or more examples, functions described in the present disclosure can be implemented by hardware, software, firmware, or any combination thereof. When this application is implemented by software, the functions can be stored in a computer-readable medium or transmitted as one or more instructions or code in the computer-readable medium. The computer readable medium includes a computer storage medium and a communication medium, where the communication medium includes any medium that facilitates the transfer of a computer program from one place to another. The storage medium can be any available medium accessible to a general-purpose or dedicated computer.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The objectives, technical solutions, and benefits of the present specification are further described in detail in the earlier-described specific implementations. It should be understood that the earlier-described descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A visualization method for a query result of a graph database, comprising:
　　receiving query content input for a target relationship network graph in a graph database, wherein the target relationship network graph comprises multiple nodes and connection edges between the nodes, wherein the query content comprises graph query statement including at least a match clause, the match clause including a matching expression formed at least by a target node of the multiple nodes;
　　querying a query result graph from the target relationship network graph according to the query content, wherein the query result graph comprises at least the target node;
　　displaying the query result graph; and
　　subsequent to the displaying the query result graph:
　　　　in response to a first operation performed by a user in a display area of the target node, adding and displaying, in the query result graph, a first-order neighboring node of the target node and a connection edge between the target node and the first-order neighboring node; and simultaneously adjusting positions of the target node, the first-order neighboring node, and the connection edge in response to a second operation performed by the user in a blank area other than a display area of the query result graph; and/or,
　　　　in response to a filter condition set by the user on an attribute parameter of the multiple nodes for the query result graph, deleting, from the query result graph, a node among the multiple nodes that does not meet the determined filter condition to obtain a filtered query result graph; and displaying the filtered query result graph;
　　wherein, the method further comprises:
　　receiving a hover mode trigger instruction and entering a hover mode; and
　　in the hover mode, displaying the target node and the first-order neighboring node in a highlight or flashing manner in response to a hover operation performed by the user in the display area of the target node.

2. The method according to claim 1, further comprising:
　　displaying an order selection menu in response to a right-click operation performed by the user in the display area of the target node; and
　　adding and displaying, according to a target order selected from the order selection menu, neighboring nodes of the target node in the target order.

3. The method according to claim 1, wherein a quantity of connection edges between the target node and the first-order neighboring node is multiple, and directions and types of the multiple connection edges are the same; and the method further comprises:
　　receiving an edge combination instruction;
　　combining the multiple connection edges according to the received edge combination instruction to obtain an aggregation edge, wherein the aggregation edge and the multiple connection edges have a same direction and type; and
　　replacing display of the multiple connection edges by using the aggregation edge.

4. The method according to claim 3, further comprising:
　　adding a quantity attribute to the aggregation edge, wherein an attribute value of the quantity attribute is a quantity of the multiple connection edges.

5. The method according to claim 1, further comprising:
　　receiving an edit mode trigger instruction and entering an edit mode; and
　　in the edit mode, updating and displaying the query result graph in response to an edit operation performed by the user on the query result graph;
　　wherein the edit operation comprises creating, deleting, or modifying a node or a connection edge.

6. The method according to claim 1, wherein a layout of the query result graph comprises any one of the following: an elastic layout, a tree layout, a ring layout, and a grid layout.

7. The method according to claim 1, wherein a layout of the query result graph is an elastic layout; and the method further comprises:
simultaneously adjusting the positions of the target node, the first-order neighboring node, and the connection edge in response to a drag operation performed by the user in the display area of the target node.

8. The method according to claim 1, further comprising:
receiving a second filter condition set by the user on an attribute parameter of a connection edge; and
deleting, from the query result graph, a connection edge that does not meet the second filter condition, to obtain the filtered query result graph.

9. The method according to claim 1, further comprising:
updating and displaying the query result graph in response to a style setting operation performed by the user on a node or a connection edge;
wherein the style setting operation comprises a color/size setting operation or an attribute parameter setting operation.

10. The method according to claim 1, further comprising:
in response to a click operation performed by the user in the display area of the target node, adding and displaying each attribute parameter of the target node.

11. The method according to claim 1, further comprising:
receiving a graph export instruction, and determining a to-be-exported target format according to the graph export instruction; and
exporting the query result graph as a picture file in the target format;
wherein the target format comprises any one of the following: a json format, a png format, and a csv format.

12. The method according to claim 1, further comprising:
displaying a scaled-down/scaled-up query result graph in response to a scroll up/down operation by the user in the blank area.

13. The method according to claim 1, further comprising:
receiving a switching instruction for switching from a graph display mode to a tree display mode; and
switching the query result graph to a text tree according to the switching instruction;
wherein the text tree comprises at least a first text node, the first text node has two types of text sub-nodes, and one type of text sub-node is configured to record each query result in a query result set corresponding to the query result graph; and
the other type of text sub-node is configured to record each query field comprised in the query result set.

14. The method according to claim 13, wherein the two types of text sub-nodes support collapsing and expanding.

15. A non-transitory computer readable storage medium having stored therein instructions that, when executed by a processor of a computing device, cause the computing device to:
receive query content input for a target relationship network graph in a graph database, wherein the target relationship network graph comprises multiple nodes and connection edges between the nodes, wherein the query content comprises graph query statement including at least a match clause, the match clause including a matching expression formed at least by a target node of the multiple nodes;
query a query result graph from the target relationship network graph according to the query content, wherein the query result graph comprises at least the target node;
display the query result graph; and
subsequent to the displaying the query result graph:
in response to a first operation performed by a user in a display area of the target node, add and display, in the query result graph, a first-order neighboring node of the target node and a connection edge between the target node and the first-order neighboring node; and simultaneously adjust positions of the target node, the first-order neighboring node, and the connection edge in response to a second operation performed by the user in a blank area other than a display area of the query result graph; and/or
in response to a filter condition set by the user on an attribute parameter of the multiple nodes for the query result graph, delete, from the query result graph, a node among the multiple nodes that does not meet the determined filter condition to obtain a filtered query result graph; and display the filtered query result graph;
wherein, the computing device is further caused to:
receive a hover mode trigger instruction and enter a hover mode; and
in the hover mode, display the target node and the first-order neighboring node in a highlight or flashing manner in response to a hover operation performed by the user in the display area of the target node.

16. A computing device, comprising a memory and a processor, wherein the memory stores executable instructions that, in response to execution by the processor, cause the computing device to: receive query content input for a target relationship network graph in a graph database, wherein the target relationship network graph comprises multiple nodes and connection edges between the nodes, wherein the query content comprises graph query statement including at least a match clause, the match clause including a matching expression formed at least by a target node of the multiple nodes;
query a query result graph from the target relationship network graph according to the query content, wherein the query result graph comprises at least the target node;
display the query result graph; and
subsequent to the displaying the query result graph:
in response to a first operation performed by a user in a display area of the target node, add and display, in the query result graph, a first-order neighboring node of the target node and a connection edge between the target node and the first-order neighboring node; and simultaneously adjust positions of the target node, the first-order neighboring node, and the connection edge in response to a second operation performed by the user in a blank area other than a display area of the query result graph; and/or
in response to a filter condition set by the user on an attribute parameter of the multiple nodes for the query result graph, delete, from the query result graph, a node among the multiple nodes that does not meet the determined filter condition to obtain a filtered query result graph; and display the filtered query result graph;
wherein, the computing device is further caused to:
receive a hover mode trigger instruction and enter a hover mode; and in the hover mode, display the target node and the first-order neighboring node in a highlight or flashing manner in response to a hover operation performed by the user in the display area of the target node.

* * * * *